United States Patent
Arthur

(10) Patent No.: US 6,259,034 B1
(45) Date of Patent: *Jul. 10, 2001

(54) WIRE PROTECTION AND STORAGE GROMMET

(75) Inventor: Richard Lee Arthur, Vienna, WV (US)

(73) Assignee: Walker Systems, Inc., Williamstown, WV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,398

(22) Filed: Feb. 18, 1999

Related U.S. Application Data

(60) Provisional application No. 60/075,239, filed on Feb. 19, 1998.

(51) Int. Cl.[7] ............................... H01B 17/26
(52) U.S. Cl. .................. 174/153 G; 174/152 G; 174/65 G; 174/65 R
(58) Field of Search .................. 174/65 G, 152 G, 174/153 G, 65 R, 65 SS

(56) References Cited

U.S. PATENT DOCUMENTS

| | | | |
|---|---|---|---|
| 3,053,564 | 9/1962 | Evans et al. | 296/44 |
| 3,099,057 * | 7/1963 | Cook | 24/141 |
| 3,518,359 | 6/1970 | Trimble et al. | 174/153 |
| 4,487,998 * | 12/1984 | Pegram | 174/153 G |
| 4,499,332 * | 2/1985 | Shea et al. | 174/48 |
| 4,685,173 * | 8/1987 | Pavur | 16/2 |
| 4,797,513 * | 1/1989 | Ono et al. | 174/153 G |
| 4,822,079 * | 4/1989 | Schulte | 285/162 |
| 4,827,080 * | 5/1989 | Castellani et al. | 174/48 |
| 5,003,130 | 3/1991 | Danforth et al. | 174/153 G |
| 5,090,644 | 2/1992 | Lenker | 248/56 |
| 5,422,437 * | 6/1995 | Schnell | 174/65 R |
| 5,453,579 * | 9/1995 | Cohea | 174/153 G |
| 5,627,342 * | 5/1997 | Kramer | 174/65 G |
| 5,701,634 | 12/1997 | Uemura et al. | 16/2.1 |

* cited by examiner

Primary Examiner—Dean A. Reichard
Assistant Examiner—W. David Walkenhorst
(74) Attorney, Agent, or Firm—McAndrews, Held & Malloy, Ltd.

(57) ABSTRACT

A wire protection grommet is constructed for installation in a wire pull opening extending between a preset and the cell of a cellular raceway. The grommet includes a central opening extending between the preset and the raceway cell and which has defines a wire pull strain relief. The grommet is constructed to lockingly engage into the wire pull opening so that it is not displaced during use. The distal end of the grommet is weighted so that the grommet self-orients itself in the opening during installation. The grommet also includes a wire storage section around which excess wiring can be wrapped. Hooks are provided for retaining the excess wire on the wire storage section.

16 Claims, 3 Drawing Sheets

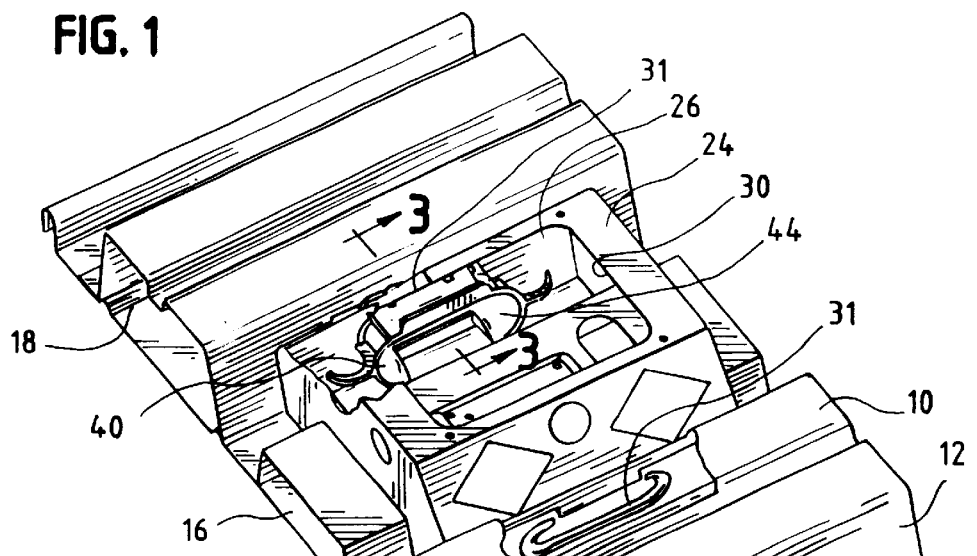
FIG. 1
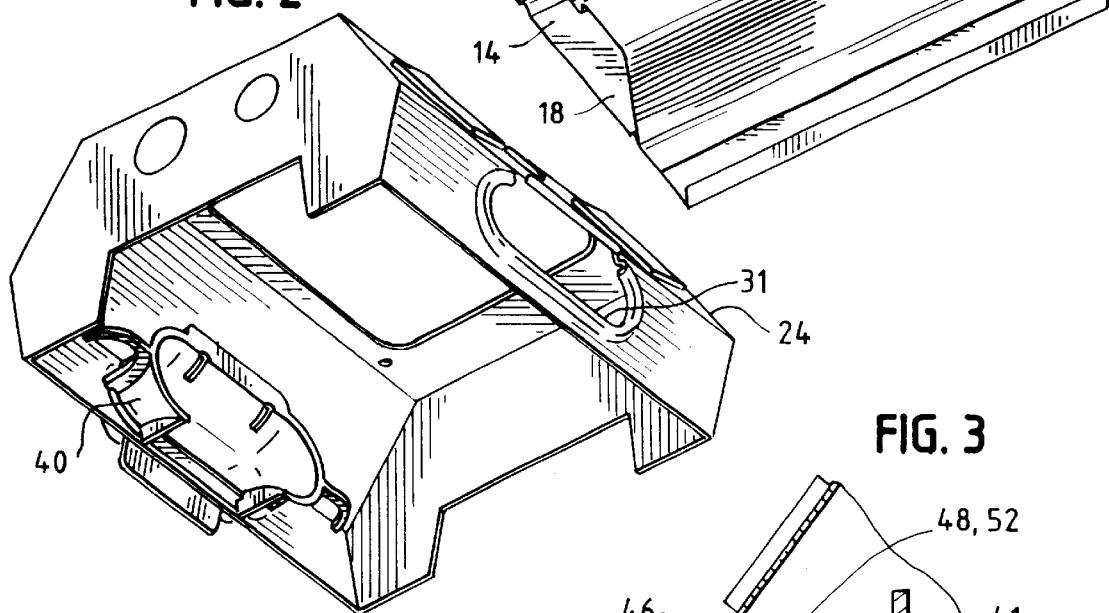
FIG. 2
FIG. 3
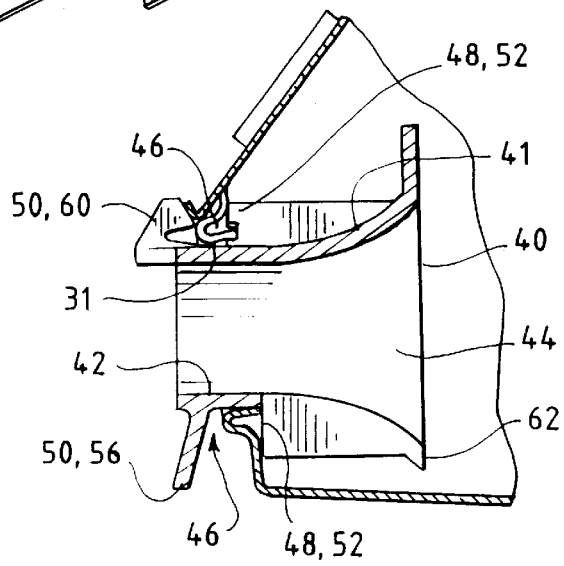

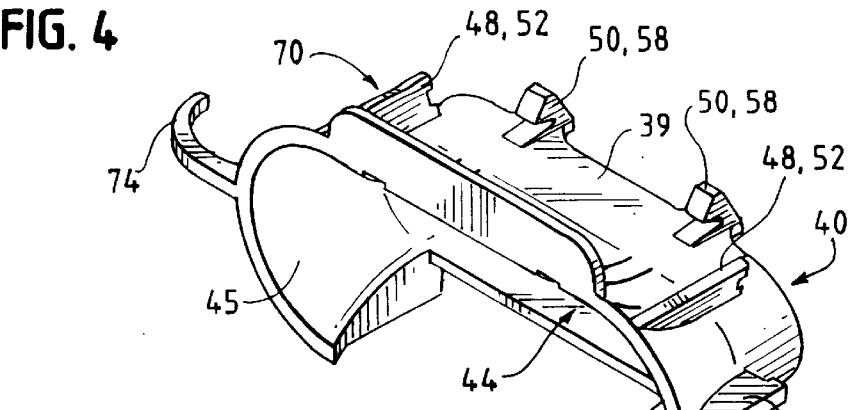
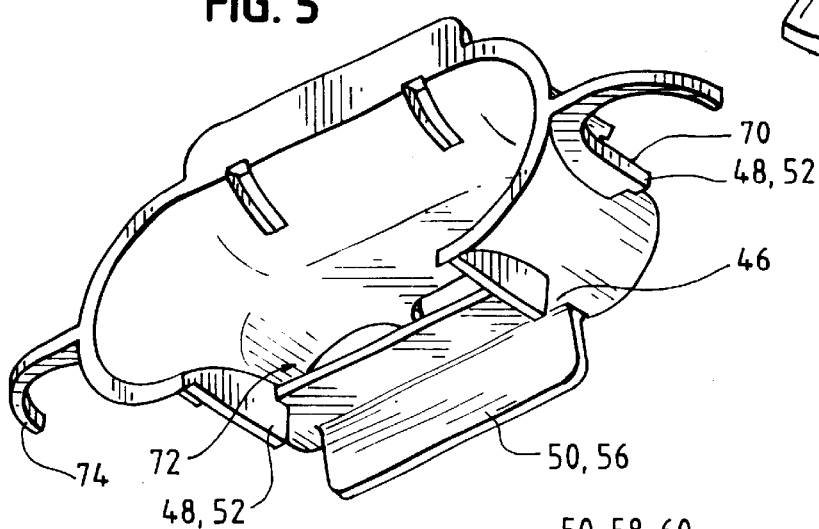
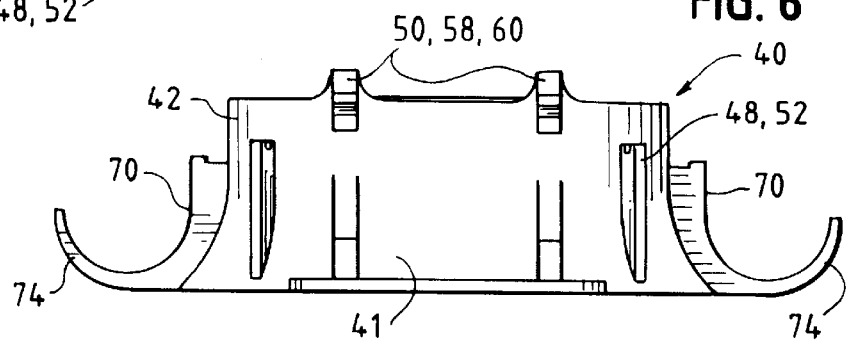
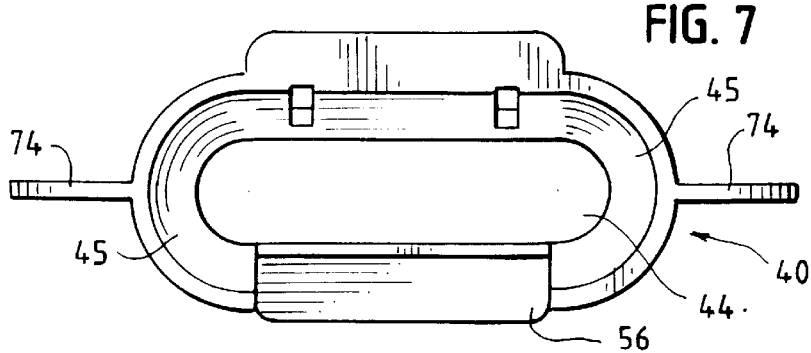

WIRE PROTECTION AND STORAGE GROMMET

CROSS-REFERENCE TO RELATED APPLICATIONS

This application is related to and claims priority benefits from U.S. Provisional Patent Application Ser. No. 60/075, 239 filed Feb. 19, 1998 entitled "Wire Protection And Storage Grommet." The '239 provisional application is incorporated herein by reference in its entirety.

STATEMENT REGARDING FEDERALLY SPONSORED RESEARCH OR DEVELOPMENT

Not Applicable

BACKGROUND OF THE INVENTION

The present invention is directed to in-floor raceway wiring systems, and more particularly to a wire pull grommet for installation in a wire pull opening between a preset and the cellular raceway.

Modern office buildings require electric power, communication, and computer data services in various combinations at a large number of locations. Often these needs are addressed by in-floor cellular raceway systems. Cellular raceway systems conventionally have a central portion or cell for carrying power cables and a pair of communication/data cells on opposite sides of the power cell. One of the communication cells may carry telephone cable and the other may carry computer, data, or other low potential cables. The cellular raceway systems are mounted on a subfloor and covered with concrete for the finished floor. Access to the underfloor service raceways is obtained through presets that are mounted on the raceways at desired locations before the concrete floor is poured. The preset defines a hollow interior compartment that is interconnected with the interiors of the raceway cells to provide access to the services that are carried in cells. A removable mud cap on the top of the preset prevents concrete from entering the interior compartment of the preset when the floor is poured. After the concrete floor has hardened, the concrete above the mud cap is broken away and the mud cap is removed to provide access to the interior of the preset.

Certification standards, such as Underwriters Laboratories (UL) and the National Electric Code, now require the opening between the preset and the cell to be grommeted so as to protect cables from being damaged as they are pulled through the opening. Additionally, current EIA/TIA standards require that any opening that will be used to pull category 5 type data cable or fiber optic cable must have a feature that will prevent cable from being damaged when pulled around a corner. This is usually accomplished by rounding the corners of the opening to a minimum radius of 1 inch. Many buildings include cellular raceway systems that were installed prior to the implementation of these requirements. Hence, there is a need for a grommet that can be installed into existing raceway systems to bring these applications into compliance with current certification standards.

BRIEF SUMMARY OF THE INVENTION

One object of the present invention is to provide a grommet for mounting in a wire pull opening extending between a preset and a cell of a cellular raceway system.

Another object of the present invention is to provide a grommet for mounting in a wire pull opening that provides a smooth, radiussed surface for pulling wires between a preset and a cell of a cellular raceway system.

Still another object of the present invention is to provide a wire pull grommet that has a passage defining a wire pull strain relief.

Yet another object of the present invention is to provide a wire pull grommet that includes a wire storage section for storing excess.

A further another object of the present invention is to provide a wire pull grommet that can be mounted in different sizes of wire pull openings.

Another object of the present invention is to provide a wire pull grommet having a wire storage portion around which excess wiring can be wrapped.

Another object of the present invention is to provide a wire pull grommet that is low cost and economical to manufacture.

Yet another object of the present invention is to provide a wire pull grommet that is durable and easy to install.

Another object of the present invention is to provide a wire pull grommet that can be retrofit into existing cellular raceway systems.

These and other objects and advantages are achieved by a wire protection grommet for installation in a wire pull opening extending between a preset and the cell of a cellular raceway. The grommet is sized for insertion through the wire pull opening and into the cellular raceway and defines central passages extending between the preset and the raceway cell. The central passage has a radiussed portion defining a wire pull strain relief. The grommet is constructed to lockingly engage into the wire pull opening so that it is not displaced during use. The distal end of the grommet is weighted so that the grommet correctly orients itself in the opening during installation. The grommet also includes a wire storage section around which excess wiring can be wrapped. Hooks are provided for retaining the excess wire on the wire storage section.

BRIEF DESCRIPTION OF THE SEVERAL VIEWS OF THE DRAWING

FIG. 1 is a partial perspective view of a raceway system employing a wire protection grommet according to the present invention;

FIG. 2 is bottom view showing the wire protection grommet installed in a preset;

FIG. 3 is a cross-section view along line 3—3 of FIG. 1;

FIG. 4 is a top perspective view of the wire protection grommet;

FIG. 5 is a bottom perspective view of the wire protection grommet;

FIG. 6 is a top elevation view of the wire protection grommet;

FIG. 7 is a front elevation view of the wire protection grommet; and

DETAILED DESCRIPTION OF THE INVENTION

Figure 8A:
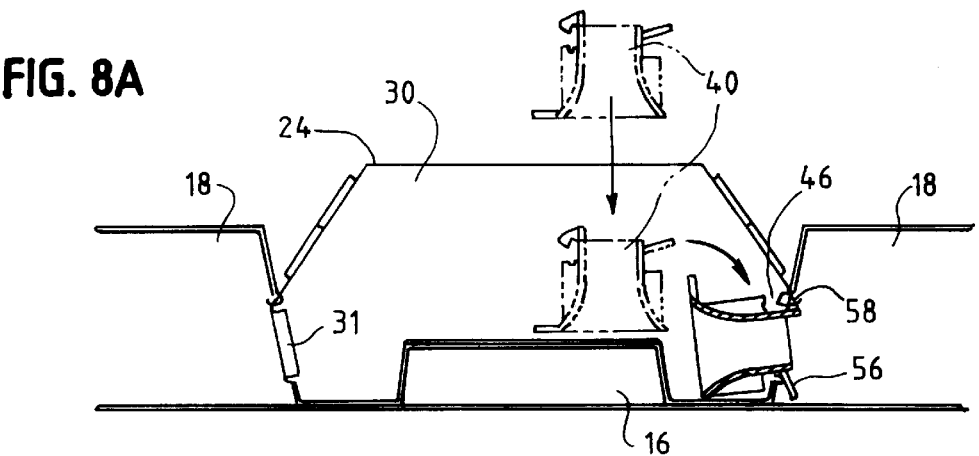
FIGS. 8A and 8B are cross-section views illustrating installation of the wire protection grommet into the wire pull opening of a raceway system.

While the invention will be described in connection with one or more embodiments, it will be understood that the invention is not limited to those embodiments. On the contrary, the invention includes all alternatives, modifications, and equivalents as may be included within the spirit and scope of the appended claims.

Referring now to FIG. 1 a cellular raceway 10 includes a top panel 12 and a bottom panel 14. The panels 12, 14 define a central power cell 16 and a pair of communication cells 18 that are positioned on opposite sides of the power cell. The cellular raceway 10 is positioned on a subfloor prior to pouring of the concrete floor. Presets 24 (one shown in FIG. 1) are mounted on the raceway 10 at preselected locations to provide access to the cells 16, 18 from the upper surface of the concrete floor. The preset 24 defines a hollow interior compartment 26 that is interconnected with the cells 16, 18 through openings to provide access to service cables that are carried inside the cells. A mud cap (not shown) is removably mounted over the top opening 30 of the preset 24. The mud cap prevents concrete from entering the interior compartment 26 of the preset 24 when the concrete floor is poured. After the concrete floor has hardened, the concrete above the mud cap is broken away and the mud cap is removed to provide access to the interior 26 of the preset 24. An activation assembly (not shown) that accepts a duplex receptacles or other wiring devices may then be installed in the preset 24.

Wire pull openings 31 extend between the interior 26 of the preset 24 and the communications cells 18 to provide access to the services carried in the communication cells. In the illustrated embodiment, the wire pull openings 31 are generally oval shaped. It will be appreciated however that the shape of these openings is merely illustrative.

Referring additionally to FIGS. 2 through 8B, a wire pull grommet 40 for mounting in the wire pull openings will now be described. The grommet 40 has a built-in bend radii for preventing damage to cables as they are pulled through the wire pull opening. The grommet 40 also is constructed to serve as a wire storage loop for storing excess wiring for future re-termination. In the preferred embodiment, the grommet can store approximately 1 meter of category 5-type cable or fiber optic cable. The grommet is preferably injection molded from a suitable material such as polyvinyl chloride (PVC).

The grommet 40 has a housing or body 38 consisting of a proximal portion 41 and a distal portion 42. The proximal portion 41 has an outer circumferential dimension that is larger than the preset opening, whereas the distal portion is constructed for insertion through the wire pull opening 31. A central opening or passage 44 extends through the grommet 40 between the preset 24 and the raceway cell 18. The central passage 44 of the grommet 40 is sized so that the grommet 40 can be held by inserting one's fingers into the central passage from the proximal end. The proximal portion 41 of the grommet 40 is flared outwardly, as is the inner surface of the central opening 44. This flared construction gives the proximal end of the central opening 44 a smooth radiussed surface 45 that functions as a wire pull strain relief. Preferably, this surface has a radius of at least 1 inch. (In an of the grommet that has been developed by the assignee, Walker Systems, Inc., this radius is 1.25 inches).

The outer surface of the grommet 40 has an annular slot 46 or groove that is configured to engage about the edge of the wire pull opening 31 to secure the grommet within the opening. In the illustrated embodiment, the longitudinal gap between a set of proximal stops 48, and a set of distal stops 50 define the annular slot 46. The proximal stops 48 are in the form of longitudinal ribs 52 or flanges extending along the outer surface of the proximal portion 41 of the grommet 40. The distal stops 50 are formed by a lower leg 56 and a pair of upwardly extending flanges 58. The lower leg 56 is angled so that its lower edge extends away from the proximal edge 62 of the grommet 40. The grommet is configured to fit in wire pull openings of different sizes. In the illustrated embodiment, the grommet fits in oval-shaped openings having a height on the order of 1.1 inches and a width ranging from 3.58 to 3.88 inches.

Figure 8B:
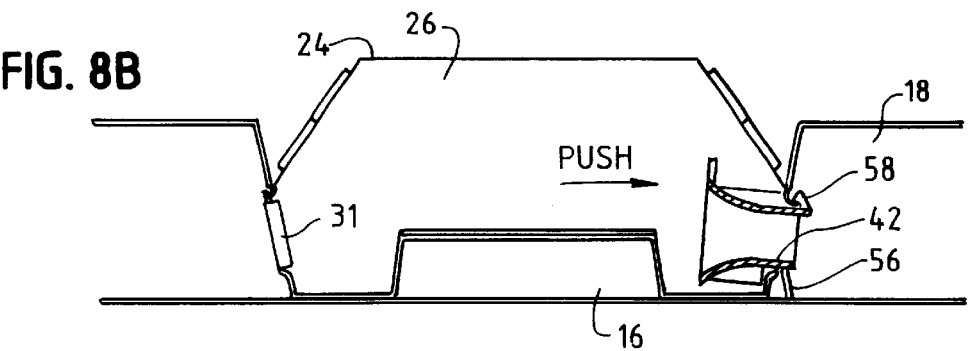

Installation of the grommet will now be described with reference to FIGS. 8A and 8B. The grommet 40 is initially lowered into the preset 24 through the top opening 30. The lower leg 56 of the grommet is then inserted through the wire pull opening and into the communication cell 18. The weight of the lower leg 56 acts to correctly orient the grommet 40 within the opening 31. As the distal portion 42 of the grommet 40 pivots downwardly, the upper flanges 58 come into contact with the upper edge of the wire pull opening 31. With continued upward pressure on the proximal end 41 of the grommet, the flanges 58 bias the grommet wall inwardly until the flanges move past the upper wall of the opening, and lock the wall within the groove 46. (See FIGS. 3 and 8A). If necessary, the grommet 40 can be removed from the opening by inserting a screwdriver into the gap between the top of the grommet and the sidewall of the preset and twisting the screwdriver.

Figure 9:
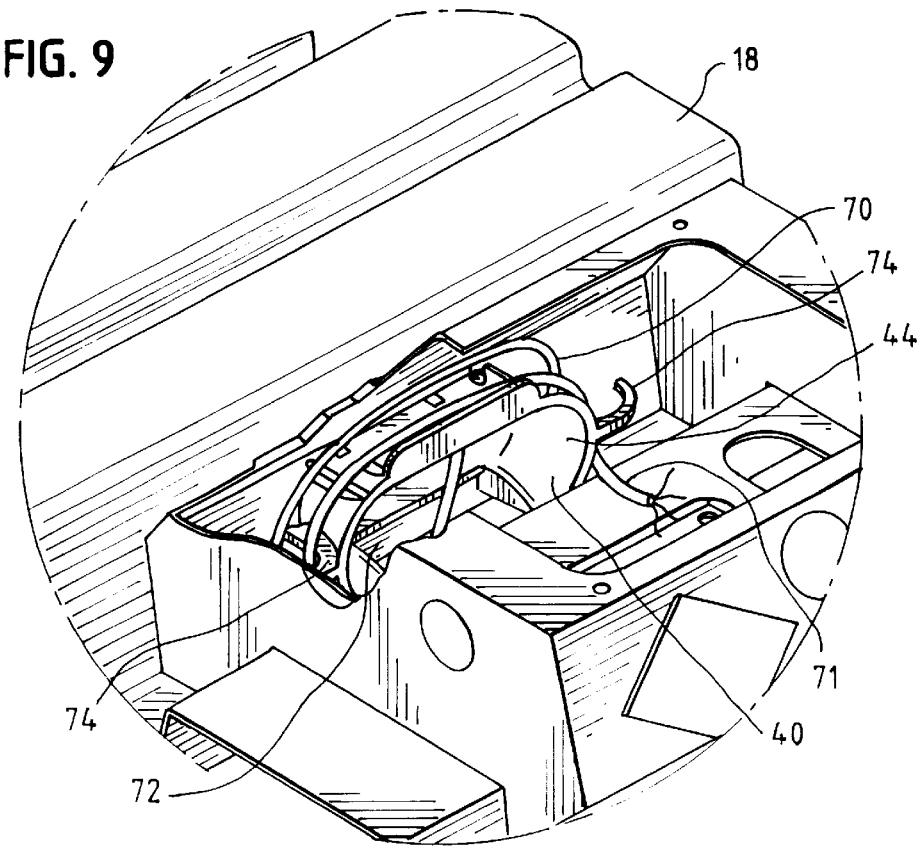
FIG. 9 is a perspective view illustrating the manner in which excess wire can be stored on the grommet.

The grommet 40 is constructed to provide a wire storage loop 70 for storing excess wire for future re-terminations. As is shown in FIG. 9, wire 71 is routed from the communication cell 18 and through the central passage 44. The wire then passes down through an opening 72 and is wrapped around the outer periphery of the grommet 40. Wire retention hooks 74 extend outwardly from the front or proximal edge of the grommet 40 to retain the wire on the wire storage section 70.

In the illustrated embodiment, the wire pull opening and the grommet are illustrated as being oval shaped. It will be appreciated, however, that the invention is not limited to this construction. For example, the wire pull opening and grommet could have circular cross sections.

What is claimed is:

1. A wire protection grommet for installation in a wire pull opening extending between a preset and a cell of a cellular raceway comprising:
   a housing configured for mounting in the wire pull opening, the housing defining a passage extending between the preset and the raceway cell, the passage defining a wire pull strain relief; and
   a wire storage section around which excess wiring can be wrapped.

2. A wire protection grommet as set forth in claim 1, wherein the grommet is configured to lockingly engage into the wire pull opening.

3. A wire protection grommet as set forth in claim 1, wherein the grommet is configured for installation in an oval-shaped wire pull opening.

4. A wire protection grommet as set forth in claim 1, wherein the grommet is configured to be mounted in wire pull openings of varying sizes.

5. A wire protection grommet as set forth in claim 1, wire pull strain relief has a radius of at least one inch.

6. A wire protection grommet as set forth in claim 1, wherein the grommet is weighted for self-orientation within the wire pull opening.

7. A wire protection grommet as set forth in claim 1, wherein the grommet is formed of plastic.

8. A wire protection grommet as set forth in claim 1, further comprising a pair of wire retention hooks for securing wire on the wire storage section.

9. A wire protection grommet for installation in a wire pull opening extending between a preset and a cell of a cellular raceway comprising:

a housing configured for mounting in the wire pull opening, the housing defining a passage extending between the preset and the raceway cell, the passage defining a wire pull strain relief; and wherein the grommet is weighted for self-orientation within the wire pull opening.

10. A wire grommet as set forth in claim 9, further comprising a wire storage section around which excess wiring can be wrapped.

11. A wire protection grommet as set forth in claim 10, further comprising a pair of wire retention hooks for securing wire on the wire storage section.

12. A wire protection grommet as set forth in claim 9, wherein the grommet is constructed to lockingly engage into the wire pull opening.

13. A wire protection grommet as set forth in claim 9, wherein the grommet is configured for installation in an oval-shaped wire pull opening.

14. A wire protection grommet as set forth in claim 9, wherein the strain relief has a radius of at least one inch.

15. A wire protection grommet as set forth in claim 9, wherein the grommet is formed of plastic.

16. A wire protection grommet as set forth in claim 9, wherein the grommet is configured to be mounted in wire pull openings of varying sizes.

* * * * *